(12) United States Patent
Heimerikx

(10) Patent No.: US 9,269,198 B2
(45) Date of Patent: Feb. 23, 2016

(54) SYSTEM AND METHOD FOR GENERATING AN IDENTIFICATION

(76) Inventor: Job Daniel Maria Heimerikx, Leiderdorp (NL)

(*) Notice: Subject to any disclaimer, the term of this patent is extended or adjusted under 35 U.S.C. 154(b) by 1791 days.

(21) Appl. No.: 11/919,524

(22) PCT Filed: Apr. 28, 2006

(86) PCT No.: PCT/NL2006/000230
§ 371 (c)(1),
(2), (4) Date: Jul. 15, 2009

(87) PCT Pub. No.: WO2006/115408
PCT Pub. Date: Nov. 2, 2006

(65) Prior Publication Data
US 2009/0302100 A1    Dec. 10, 2009

(30) Foreign Application Priority Data
Apr. 28, 2005   (NL) .................................. 1028897

(51) Int. Cl.
*G06F 17/00* (2006.01)
*G07B 17/00* (2006.01)
*G06Q 10/08* (2012.01)

(52) U.S. Cl.
CPC .......... *G07B 17/00508* (2013.01); *G06Q 10/08* (2013.01); *G07B 2017/0058* (2013.01); *G07B 2017/00443* (2013.01)

(58) Field of Classification Search
CPC ....... G06Q 20/02; G07F 7/1008; G06K 17/00
USPC ........................................... 235/375; 700/226
See application file for complete search history.

(56) References Cited

U.S. PATENT DOCUMENTS

| | | | |
|---|---|---|---|
| 6,428,219 B1 | 8/2002 | Stier et al. | |
| 2003/0195778 A1 | 10/2003 | Smith | |
| 2004/0215531 A1* | 10/2004 | Stashluk et al. | 705/28 |
| 2005/0273434 A1* | 12/2005 | Lubow | 705/59 |

* cited by examiner

*Primary Examiner* — Rafferty Kelly
(74) *Attorney, Agent, or Firm* — The Webb Law Firm

(57) ABSTRACT

The present invention relates to a system for generating an identifier for guiding the transport of a return product during shipment from an end user to one or more processing or collection centers, wherein the identification is suitable for use during transport in a number of countries or by means of a number of transport organizations each utilizing their own identification system, including means for generating an identifier comprising: first, identification data for identifying of the product by the transport organization during transport, and second, identification data for identifying the return product during storage and/or processing.

11 Claims, 5 Drawing Sheets

SYSTEM AND METHOD FOR GENERATING AN IDENTIFICATION

BACKGROUND OF THE INVENTION

The present invention relates to a system and a method for generating an identification for use in the transport of return products from a large quantity of pickup locations to several collection locations, wherein use is made of a number of transport or postal companies, at least some of which make use of their own identification system for individual packages.

It is known for return products such as products under guarantee or products which are otherwise defective to be collected and/or repaired. For this purpose they are transported by means of courier services, transport firms or postal companies. Carrying out these transports for a large number of packages requires an enormous amount of logistic work, such as coordination operations. This work is essential in achieving a good result, but involves an enormous cost outlay.

SUMMARY OF THE INVENTION

In order to enable said transports to be carried out with fewer coordination operations, the present invention provides a system for generating an identifier for guiding the transport of a return product during shipment from an end user to one or more processing or collection centres, wherein the identification is suitable for use in identification systems during transport in a number of countries or by means of a number of transport organizations each utilizing their own identification system, comprising means for generating an identifier comprising:
  first identification data for identifying of the product by the transport organization during transport, and
  second identification data for identifying the return product during storage and/or processing.

Such a system in an embodiment according to the present invention has the advantage, among others, that the package with the return product can be identified in the whole transport process by means of the one identifier.

The first identification data preferably comprise a unique postal code. An advantage hereof is that a postal company can identify such a package in unique manner so that it can for instance be tracked. Billing is also possible when the code is used. Unique codes are limited in number. Used codes can be reused.

In a preferred embodiment the identifier comprises a label. By means of a label with two identifiers a package can be identified by a transport firm or a postal company with the own systems of that company, and the package can be identified and tracked in the course of further transport, storage and repair.

The means for generating the identifier preferably comprise means for storing identification data relating to packages in a format suitable for a variety of transport or postal companies in different countries. It hereby becomes possible to apply the system in a very wide geographical area, which results in economic advantages since cost advantages in the storage and repair process become possible through efficiencies of scale.

An embodiment advantageously further provides a system comprising communication means for communicating with computer systems of the transport and/or postal companies. Owing to the automatic communication all kinds of information can be recorded in real time, whereby the system can be continuously controlled subject to for instance capacity. Products can for instance be sent to storage or repair locations where there is overcapacity in order to relieve other locations and improve the efficiency of the system.

In a further embodiment the identifier comprises a memory for storing the identification data and a communication member for communicating the data. The communication member preferably comprises an antenna. Automatic scanning of the identification data can hereby be performed in simple manner and the presence of return products can be more readily scanned.

At least a part of the identification data on the identifier is preferably represented by means of a graphic code such as a bar code. An advantage is that optical scanning is possible.

A further aspect of the present invention relates to a method for generating an identifier for guiding the transport of a return product during shipment from an end user to one or more processing or collecting centres, wherein the identifier is suitable for use during transport in a number of countries or by means of a number of transport organizations each utilizing their own identification system, wherein the method comprises means for generating an identifier, comprising:
  first identification data for identifying of the product by the transport organization during transport, and
  second identification data for identifying the return product during storage and/or processing.

Advantages of such an identifier are outlined in the foregoing. Further advantages will be explained with reference to specific embodiments.

A further aspect of the present invention relates to a method for tracking a package, comprising a return product with an identifier according to one or more of the foregoing claims during shipment from an end user to one or more processing or collection centres and/or during the presence at one of the centres by means of a system according to one or more of the claims 1-8 and/or according to a method according to claim 9, 10 or 11, wherein at one or more moments from dispatch of the return product by the end user the identifier is scanned in order to determine the identity of the return product.

Such a method provides the option of transporting many return products to one or several collection or repair centres, wherein these products can be identified by means of centrally generated identifiers, on the basis of which both the transporter and the collection or repair centres can identify the products.

BRIEF DESCRIPTION OF THE DRAWINGS

Further advantages, features and details of the present invention will be further elucidated on the basis of a description of preferred embodiments with reference to the accompanying figures, in which.

DETAILED DESCRIPTION OF THE INVENTION

Figure 1:
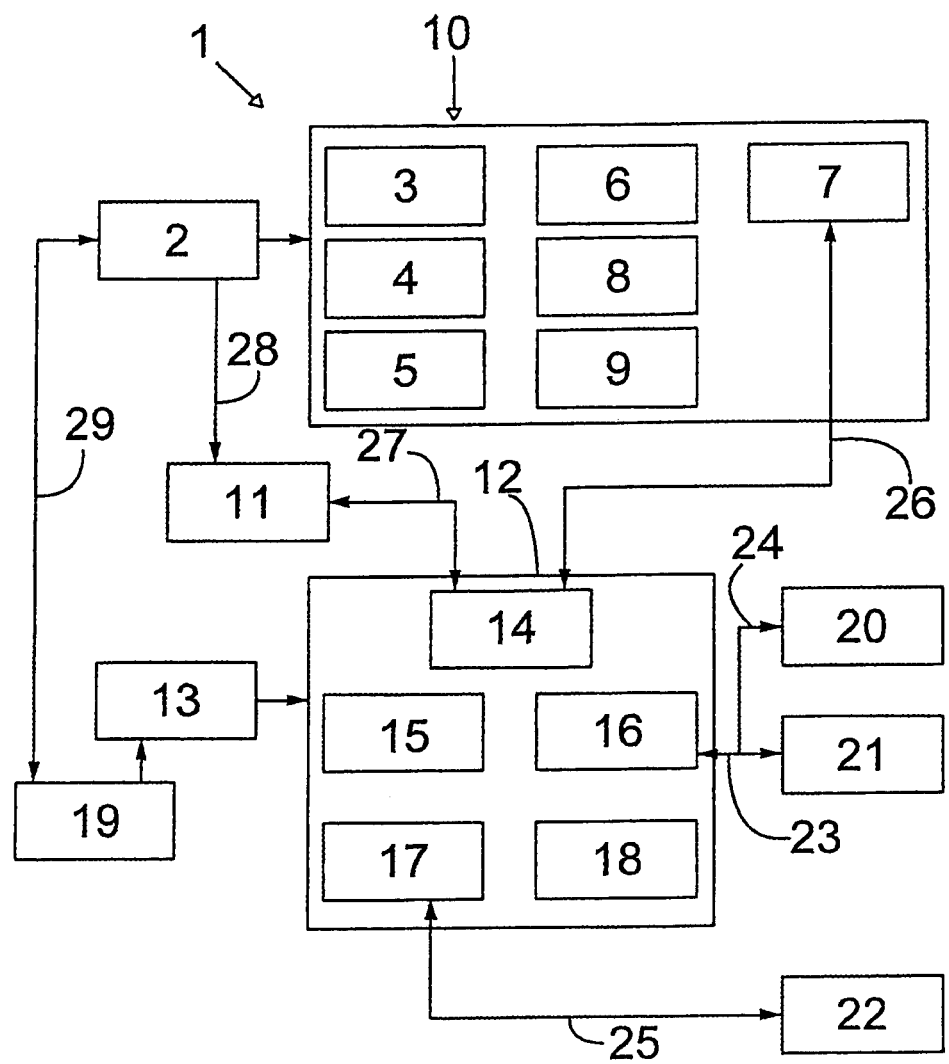
FIG. 1 is a schematic representation of a first preferred embodiment according to the present invention.

A first embodiment according to the present invention (FIG. 1) relates to a system 1 for handling return products and/or generating identification members such as a label or an identification device comprising at least an antenna and a data storage for storing and communicating an identification for the purpose of identifying the return products in system 1.

When a user of a product has a complaint relating to a product, he/she will want to return this product in order to resolve the complaint. The return of defective products is per se known. Not known however is a system that is suitable for efficient guiding of the implementation of a product return process which is suitable for functioning in a wide geographical area where a variety of regulations apply and a plurality of postal companies are active.

The present system can be used in very efficient manner wherein operational transport services can be carried out by postal and/or transport companies which use per se an autonomous guiding system.

Figure 5:
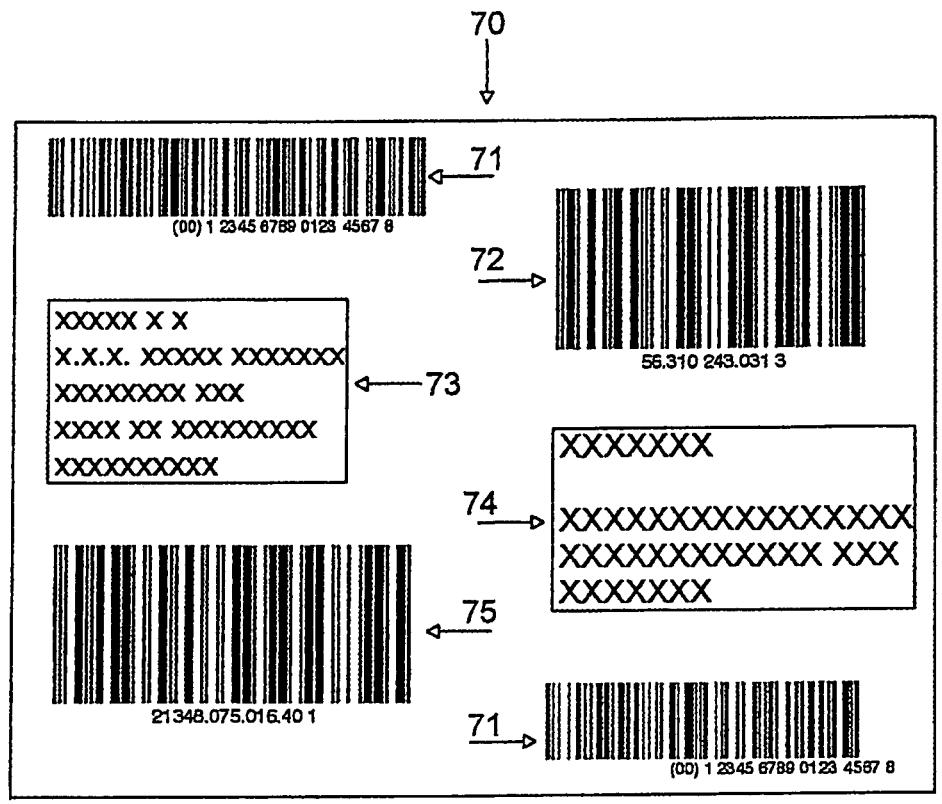
FIG. 5 is a schematic representation of an embodiment of a label according to the present invention.

In an embodiment according to the present invention use is made for this purpose of a combination of a unique system identifier 71 and a unique transport identifier or post identifier 72 (FIG. 5). Using this combination of identifiers, such as for instance on a label as shown in FIG. 5, it becomes possible to allow a transport, courier or postal company to provide a part of the transport of a return product on the basis of a first identifier 72, wherein identification of the return product can be performed on the basis of system identifier 71.

System 1 comprises a server 13 for performing a number of processes 12. The system further comprises a server 2 for coupling to a wide area network such as the Internet for the purpose of performing a number of processes 10. The system also comprises a central database 19 and a label storage database 11. These components can be integrated in a physical computer system or can function in geographically dispersed manner in a so-called distributed system.

Data relating to the identification codes for the identification members or identification devices are stored in identification database 11. An advantage hereof is that unique identifications can be reused after they have been generated and used for the return of a product, or it is otherwise apparent that they are once again unique. It is important that a generated and issued identifier is unique during the process of transporting the return product, so that the product can be identified on the basis of the identifiers during both a transport phase and a later processing phase. Possible reuse of the unique codes has the advantage that use can be made for a longer period of a limited number of codes, even though there can already be very many different ones.

The processes 12 carried out by server 13 can be further subdivided into a process 14 for generating the identifier or label 70, a process for performing address validations and/or logistic optimizations, a process 16 for generating batches of labels, a process 17 for controlling a printing system 22, and a process for communicating with computers 20, 21 of the external transport organizations.

The label generating process 14 serves to generate a unique label comprising the transport identifier 72 and the system identifier 71 on the basis of a request from process 10. Process 10 servers to gather data for the system and to generate a label 70 for a request from a user of a return product. Process 14 is further developed and placed in a context in FIGS. 2 and 4. In process 14 for generating labels both identifiers are combined and data relating thereto are sent to database 11 for storage purposes. In practice these data can be stored together in an identification device, such as for instance a wirelessly accessible identifier (RFID) or an identifier with read means by means of electronic contacts or by means of a label which can be arranged on a transport package as shown in FIG. 5. After combining the identifiers 71, 72, which is further explained with reference to FIGS. 2, 4, a printable file is made available to the user who can arrange this on the transport package, so that the package can be collected by for instance a postal service making use of identifier 72.

Such a label preferably further comprises a so-called POD (proof of drop-off) strip to which a stamp can be applied at a post office as proof that the packet has been dispatched at this post office. The label can be designed such that it complies with the specifications of the transport company or postal company which carries out the transport in the first instance.

Process 15 is suitable for performing validations of addresses and for optimizing the logistics of the return products. Process 16 is for generating large quantities of labels according to the present invention. Such batches of labels are added at a later stage to the package of the products possibly being sent back. If there is a complaint concerning such a product, the label can then be arranged on a transport package when the product is return shipped. It is for instance possible here for labels comprising the system identifier 71 to be preprinted, this preprinted label being suitable for use in a series of countries or a series of transport or postal companies. A large quantity of unique postal identifiers or bar codes 72 can here then be combined on a sticker sheet, so that the end user can place a sticker on the label for transport by means of a postal company suitable for him/her. In such a case the combination of system identifier 71 and all postal identifiers 72 present on the sticker sheet is preferably stored. It hereby becomes possible that the system according to the present invention can be applied even if it is not known beforehand where the product will be used. Since the postal bar codes are unique, when a bar code from the sticker sheet with the large quantity of different bar codes is recognized by the system as having been used for a return shipment, the remaining bar codes on the sticker sheet can be released for reuse in for instance process 14 for generating the labels.

Process 17 serves as interface of the system by means of a connection 25 to a printing system 22 for printing the batch of labels generated in process 16. In an alternative embodiment the batch of labels can be replaced by a batch of RFIDs, which are able to store information relating to both codes. Relevant data relating to the system and the method performed by means of the system are stored in central database 19.

Process 14 generates data for an identification member on the basis of a request to do so on the basis of for instance a product failure, whereby a product must be return shipped to the manufacturer or a repair service. For this purpose the manufacturer makes contact by means of its computer with a client website 3 generated by server 2. Data are entered on this website by the consumer. After the data have been entered, the consumer receives an e-mail having therein a link to site 4 where the label can be retrieved.

On this site 4 for retrieving the label the consumer will find the prepared label having thereon the correct information, including representations of the unique identifications. There are also instructions for the use of the label and for instance for the method of packing the product. There is the further option for the consumer to print the label on a printer at his/her disposal, in addition to the option of having the label sent if the consumer does not have a printer available.

If the client does not have a computer, the data inputted into the system via website 3 can be inputted via website 5, wherein a call centre employee inputs these data. Contact can be made with the call centre by telephone.

Figure 2:
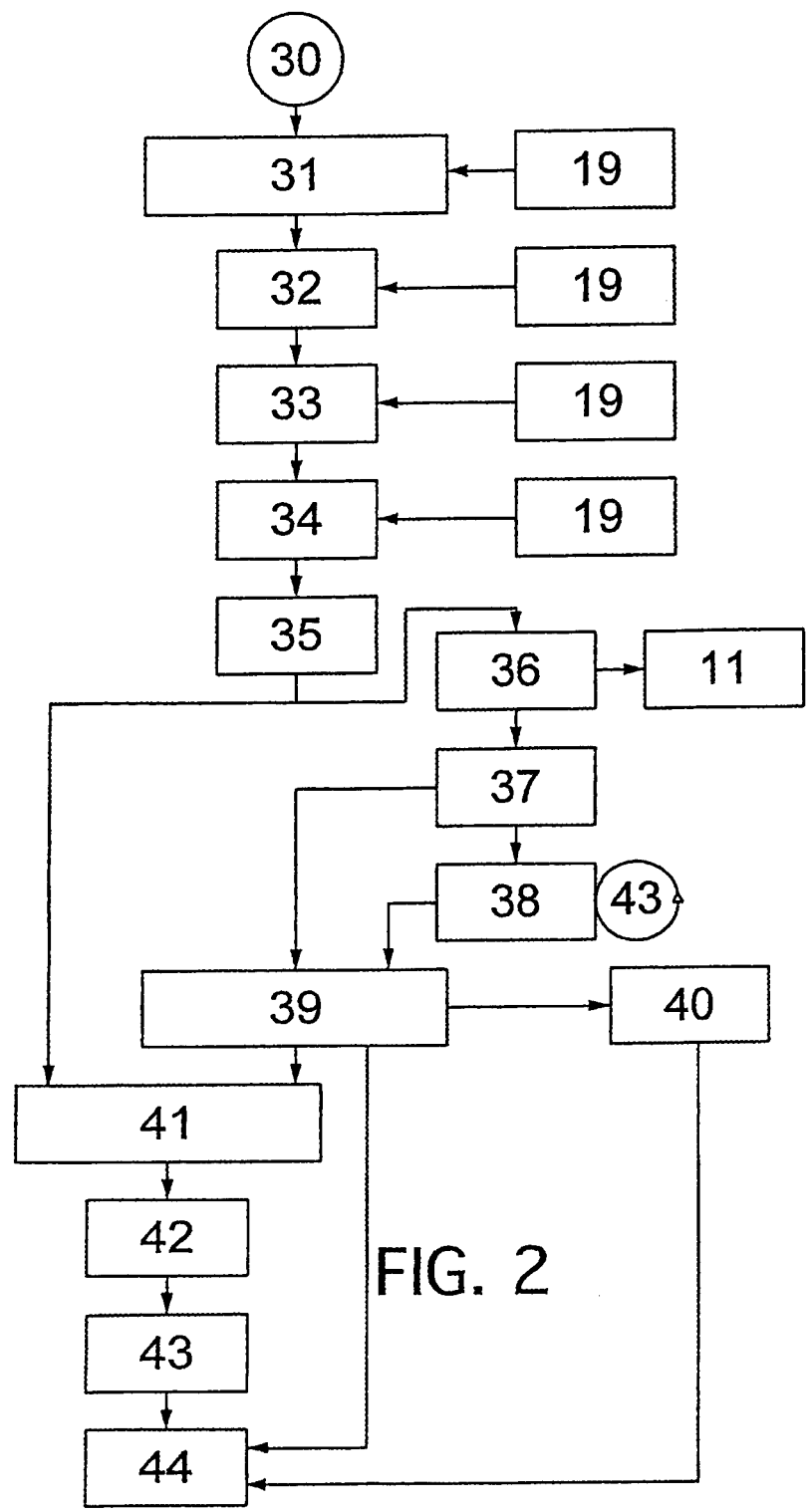
FIG. 2 is a schematic representation of a preferred embodiment of a method according to the present invention.

FIG. 2 shows a part of process 14 in greater detail, and the practical purpose of this process is explained on the basis of process steps based on the identifiers generated by means of process 14.

The method begins in step 30. In step 31 the data are entered in server 2 by means of one of the website processes 3 or 5. These data are then stored in central database 19. In step 32 these data are retrieved from database 19 and checked. A check is for instance made here as to whether the guarantee data relating to the product for returning are in order.

In step 33 the system identifier 71 is created or selected in suitable manner from a file of database 19. In step 34 a non-used, or unique, transport identifier or post identifier 72 is selected or generated. In step 35 a label is generated comprising a combination of the above generated codes, optionally also comprising alphanumeric address data 74 and/or return address data 73. In step 36 a graphic representation of the label is subsequently made available via website 4 for making available the labels. If the label is actually downloaded and the unicity of the codes thereon have to be guaranteed in the outside world, these data are stored in databases 11 for storage of label data, so that the unicity can remain guaranteed. In step 37 the label is optionally sent by e-mail to the user, whereafter in step 38 the sent e-mail can be confirmed. In step 43 the e-mail is opened, which can be used as trigger for sending the confirmation. In step 39 the client retrieves the label from website 4 for retrieving the labels. Step 45 serves for opening the desired label. If the consumer can print the label him/herself, the label is printed by the consumer in step 40. If the consumer has no printing facility, an entry is made in step 41 that the label must be sent by post to the consumer. An instruction is then sent to the print-label interface 17 to have the label printed, whereafter the label is sent to the consumer in step 43. In step 44 the label is finally arranged on the transport package of the product for return shipment, whereafter the return product can be sent, and according to the present invention it can be identified wherever it may be located on its subsequent travels, whether this be at a stage where the package is in the possession of a transport or postal company or in the possession of the manufacturer or repair company.

Figure 3:
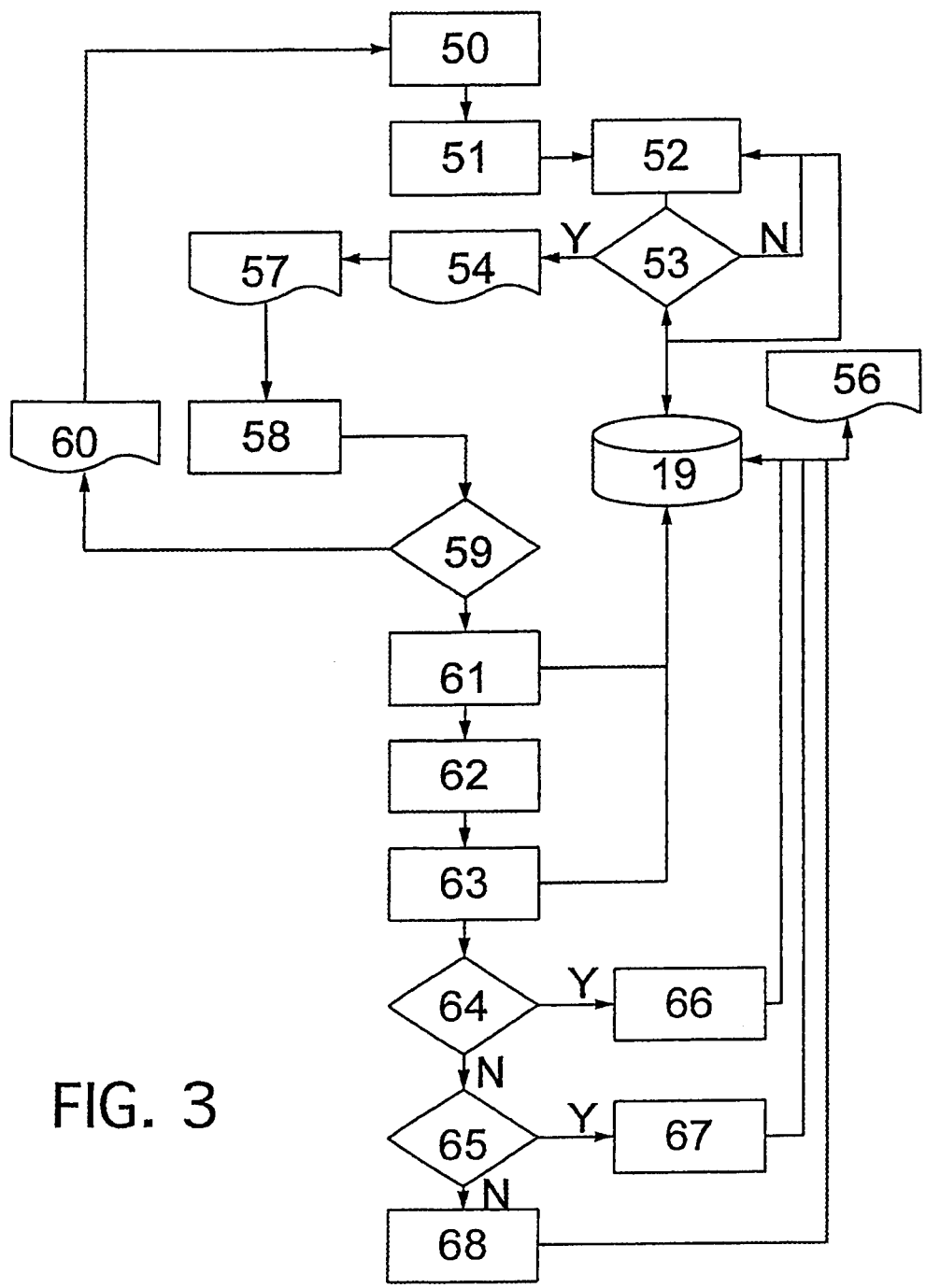
FIG. 3 shows a further schematic representation of a preferred embodiment according to the present invention.

FIG. 3 shows an embodiment of a transport process for use with the present invention. A user 50 of a return product enters in step 51 data relating to the return product, which data are processed on server 2 and stored in database 19. The consumer inputs the data in step 52. As already stated, in step 53 the accuracy of the data is checked in server 13 by means of process 15. This is immediately fed back to the consumer by means of the website or communicated to the consumer via an e-mail. In step 54 the owner of the return product receives the above mentioned e-mail with the link to the website from which can be downloaded the label which has meanwhile been generated. This site 4 is made temporarily available in step 57 to the recipient of the e-mail who can download and print the label and can read optional instructions for use. When the printing of the label is impossible, sending by post can be requested by means of a button on the website. In step 58 the return package is delivered to a post office, a collection point of a transport firm, or the package is collected from the consumer.

In step 59 is determined whether a consumer requires proof of dispatch of the package, whereafter, if this is the case, a POD which has for instance been stamped is returned to the consumer in step 60. During the transport process the first bar code 72 is then scanned in step 61, to the extent the transport company requires this for the proper delivery of the package at a delivery address specified by means of addressing 74 and/or on the basis of a reference to identification code 72. It is possible here for track-and-trace data to be passed on to central database 19 of the system. In step 63 the package is subsequently delivered to the delivery address, this likewise being transmitted to central database 19. On the basis of system identification code 71 it is determined in step 64 whether operations have to be carried out with the return product which, if this is the case, are carried out in step 66, this being reported to central database 19. If according to step 64 no operations have to be carried out, it is determined in step 65 whether the product must be discarded as waste. If this is the case, the product is delivered to a recycling station in step 67, this being reported to database 19. If according to step 65 the product is not waste, it is stored in step 68, this being reported to central database 19.

Figure 4:
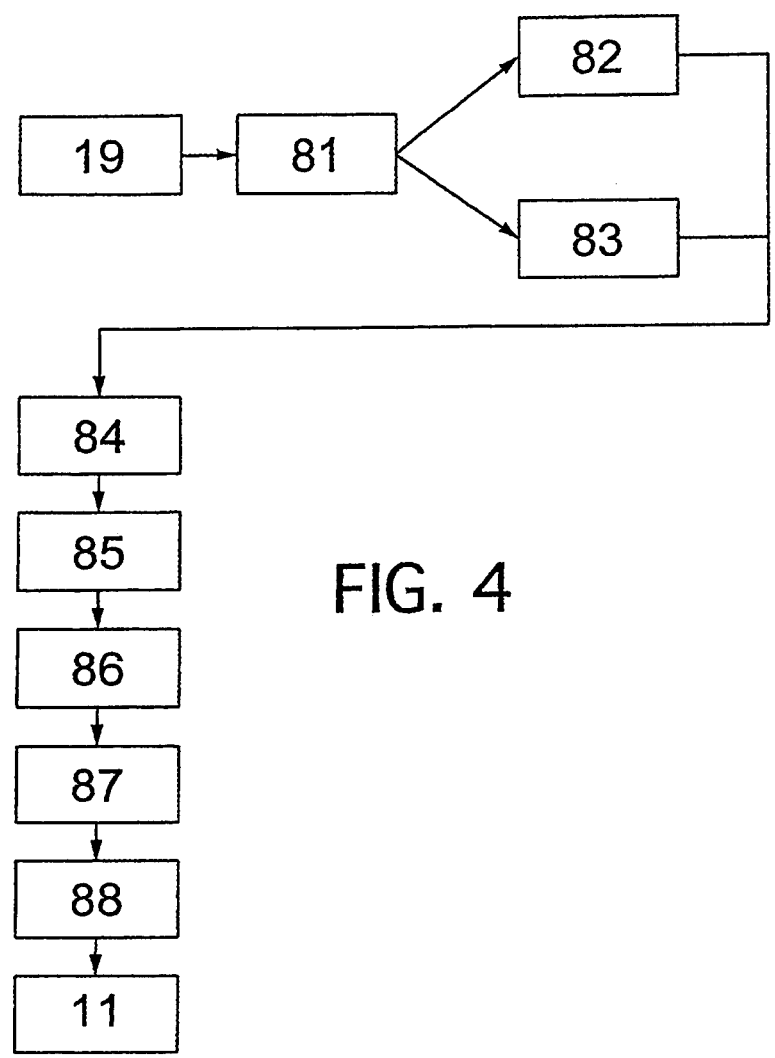
FIG. 4 shows a further schematic representation of a preferred embodiment of a method according to the present invention.

FIG. 4 shows schematically the steps taken to manufacture the label in step 35 of FIG. 2. From label database 19 a Java object 81 having therein the data relating to the label is generated by means of the step 35 of FIG. 2 described in the foregoing. This Java object 81 is then converted into an XML file 82 with the textual data, such as for instance the address data and the data relating to bar codes 71, 72, 75. On the basis of the data from Java object 81 an XSL template 83 is also used having therein the layout for the label which complies with the requirements of the transport or postal company. By means of an XSLT process 84 the XML file 82 is then processed on the basis of the XSL template 83, this resulting in an XML-FO file 85. On the basis of this XML-FO file 85 a PDF file 87 and/or a PNG file 88 is made by means of a FOP process 86 and stored in database 11.

FIG. 5 shows an embodiment of a label according to the present invention. Label 70 comprises the unique system identification code 71 twice. The label also comprises a unique postal identification bar code 72. Addressing 74 of the delivery address is printed in legible letters for the purpose of postal handling during the transport process. If for one reason or another the product has to be sent back, it is provided for this purpose with a return address 73. It is further possible by means of a further bar code 75 to store additional information on the label depending on specific applications, such as for instance identifying specific product properties.

The invention is described in the foregoing on the basis of preferred embodiments. This description should not be interpreted as limited explanation of the invention. The rights sought are defined in the appended claims.

The invention claimed is:

1. A system for generating return labels, the label comprising a first and a second code, for arranging thereof during the transport of a return product during shipment in a package from an end user to one or more processing or collection centers, wherein the system is suitable for generation of labels, the system comprising:
   data entry means for entry of data into the system; and
   processing means for processing the label generation, wherein:
   the first code comprises a unique identificator for identifying the return product during storage and/or processing after the transport;
   the second code comprises a unique identificator for identifying the return product by the postal system during transport usable during transport in postal systems in at least the postal system of two or more countries each utilizing its own postal identification system;
   the system is capable of generation of labels based on an on demand data entry operation regarding a need to return the product as well as based on information from a label storage database for second codes;
   the labels being generated comprising printable bar codes as representation of the first and second codes; and
   the system comprises means for generating the identifier comprising means for storing identification data relating to packages in a format suitable for a variety of transport or postal companies in different countries.

2. The system as claimed in claim 1 wherein the label comprises a third bar code to store additional information on the label depending on specific applications.

3. The system as claimed in claim 1, comprising communication means for communicating with computer systems of the transport and/or postal companies.

4. The system as claimed in claim 1, comprising a server adapted to communicate with computers of owners of return products for the purpose of transferring the identifier.

5. The system as claimed in claim 1, wherein the identifier comprises a memory for storing the identification data and a communication member for communicating the data.

6. The system as claimed in claim 5, wherein the communication member comprises an antenna.

7. The system as claimed in claim 1, wherein at, least a part of the identification data on the identifier is represented by means of a graphic code such as a bar code.

8. A method for generating return labels comprising a first and a second code for adhesion thereof during the transport of a return product during shipment in, a package from an end user to one or more processing or collection centers, the method being executable by means of a system according to claim 1, wherein the method is suitable for generation of labels, the method comprising the steps of:
   entry of data into the system;
   processing the label generation, wherein:
   the first code comprises a unique identificator for identifying the return product during storage and/or processing after the transport;
   the second code comprises a unique identificator for identifying the product by the postal system during transport usable during transport in postal systems in at least the postal system of two or more countries each utilizing its own postal identification system;
   the system is capable of creating labels based on an on demand data entry operation regarding a need to return the product as well as based on information from a label storage database for second codes;
   the labels being generated comprise printable bar codes as representation of the first and second codes; and
   the system comprises means for generating the identifier comprising means for storing identification data relating to packages in a format suitable for a variety of transport or postal companies in different countries.

9. The method as claimed in claim 8, comprising steps for forming and/or combining the identification data on the basis of data stored in one or more data files which are accessible for performing of the method.

10. The method as claimed in claim 8, comprising steps for printing at least a part of the identification data on the identifier in the form of an at least partially automatically readable format.

11. A method for tracking a package, comprising a return product with an identifier as claimed in claim 1 during shipment from an end user to one or more processing or collection centers or during the presence at one of the centers by means of a system as claimed in claim 1 or according to a method as claimed in claim 8, wherein at one or more moments from dispatch of the return product by the end user the identifier is scanned in order to determine the identity of the return product.

\* \* \* \* \*